US012755209B1

(12) United States Patent
Ardazi et al.

(10) Patent No.: US 12,755,209 B1
(45) Date of Patent: Oct. 6, 2026

(54) ADVANTAGE WEIGHTED SAMPLING FOR GROUP-BASED RELATIVE POLICY OPTIMIZATION IN MACHINE LEARNING

(71) Applicant: INTUIT INC., Mountain View, CA (US)

(72) Inventors: Shai Ardazi, Tel Aviv (IL); Ofir Ben Shoham, Giv'atayim (IL); Shirli Di Castro Shashua, Kfar Saba (IL); Gidi Zilbar, Ein Shemer (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/374,034

(22) Filed: Oct. 30, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2020/0151562 A1* 5/2020 Pietquin ............... G06N 3/0499

OTHER PUBLICATIONS

Li et al., "RePO: Replay-Enhanced Policy Optimization", Jun. 11, 2025, arXiv:2506.09340v1, pp. 1-11. (Year: 2025).*
Kauf et al., "Log Probabilities Are a Reliable Estimate of Semantic Plausibility in Base and Instruction-Tuned Language Models", Oct. 21, 2024, arXiv:2403.14859v2, pp. 1-15. (Year: 2024).*
Shao et al., "DeepSeekMath: Pushing the Limits of Mathematical Reasoning in Open Language Models", Apr. 27, 2024, arXiv: 2402.03300v3, pp. 1-30. (Year: 2024).*

* cited by examiner

*Primary Examiner* — Brent Johnston Hoover
(74) *Attorney, Agent, or Firm* — Patterson + Sheridan, LLP

(57) ABSTRACT

Aspects of the present disclosure provide techniques for optimizing a policy model in a reinforcement learning framework, involving generating output completions for an input query, evaluating the output completions with a reward model, and storing related data in a replay buffer. Certain aspects include computing weighted advantages for output completions sampled from the replay buffer and modifying policy model parameters based on these weighted advantages to enhance model performance.

17 Claims, 5 Drawing Sheets

ADVANTAGE WEIGHTED SAMPLING FOR GROUP-BASED RELATIVE POLICY OPTIMIZATION IN MACHINE LEARNING

INTRODUCTION

The present disclosure pertains to the field of machine learning, specifically focusing on reinforcement learning techniques. The disclosure introduces computing weighted advantages of output completions stored in a replay buffer mechanism of a Grouped Relative Policy Optimization (GRPO) framework, facilitating enhanced training efficiency and computational resource management by weighting the computed advantages of output completions stored in the replay buffer, thereby addressing issues related to high computational costs.

BACKGROUND

In the field of machine learning, particularly in the domain of reinforcement learning (RL), the optimization of policy models, such as large language models (LLMs), presents significant technical challenges. Reinforcement learning involves the iterative improvement of models based on feedback from their environment, typically in the form of computed rewards. The Grouped Relative Policy Optimization (GRPO) algorithm is one technique in this domain that utilizes group-relative advantages to optimize policy models. GRPO involves comparing multiple generated outputs for the same input prompt to determine normalized advantages, followed by policy model updates based on the determined advantages. However, the GRPO algorithm requires fresh inferences to be generated using the policy model for each policy model update, leading to inefficiencies and high computational costs. Furthermore the use of fresh inferences for each policy model optimization leads to what is often referred to as the "sample waste" problem.

What is needed is a system that addresses these inefficiencies by solving the issues of slow learning and high compute costs, as well as reducing sample waste.

BRIEF SUMMARY

In one aspect, a method for optimizing a policy model in a reinforcement learning framework is provided. The method includes: determining an input query from a task distribution; generating a plurality of output completions for the input query using a first version of the policy model; evaluating the plurality of output completions using a reward model to assign scalar reward values; storing, in a replay buffer, one or more tuples comprising the input query, the output completions, the scalar reward values, and log probabilities of the plurality of output completions; sampling a group of stored tuples, including the one or more tuples, from the replay buffer; computing, based on the scalar reward values and the log probabilities, a weighted advantage for each output completion in the group of stored tuples relative to other output completions in the group of stored tuples using normalized reward difference; and automatically modifying one or more parameters of the policy model, based on the weighted advantages to produce a second version of the policy model.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for automated content generation in a brand voice through machine learning.

The disclosed technology pertains to a method and system for optimizing a policy model within a reinforcement learning framework, specifically focused on optimizing machine learning models such as large language models (LLMs). More specifically, the disclosed technology pertains to a Grouped Relative Policy Optimization (GRPO) framework including a replay buffer mechanism capable of storing grouped outputs, rewards, and log-probabilities across multiple optimization steps. Aspects of the present disclosure are directed to applying weights to advantages computed for output completions (e.g., responses) generated for an input query by a policy model (e.g., machine learning model) of the GRPO framework and stored in the replay buffer mechanism. By applying weights to the computed advantages for the output completions generated by the policy model, the disclosed techniques may allow for improved training of the policy model, because the policy model may be trained using output completions that are more beneficial (e.g., having advantages that are weighted more heavily compared to the advantages of other output completions) to training the policy model. In this manner, policy models trained using weighted advantages according to the present disclosure may converge at an optimal configuration faster compared to policy models trained using conventional approaches (e.g., randomly selecting output completions using non-weighted advantages).

Furthermore, as will be discussed below in more detail with reference to FIG. 3, the non-weighted advantages of output completions generated by the policy model may be reduced after each iteration of training the policy model. For instance, the non-weighted advantages may be multiplied by a decay factor (e.g., a constant value), thereby reducing the importance of the non-weighted advantages over time. In this manner, by reducing the non-weighted advantages of output completions each time new output completions are generated during training of the policy model, the disclosed techniques may ensure that the policy model favors the most recent output completions generated by the policy model.

Example aspects of the present disclosure provide numerous technical effects and benefits. For instance, by weighting advantages computed for output completions generated by the policy model differently, the disclosed techniques may provide for improved training of the policy model by thereby minimizing (or at least reducing) computational waste associated with training the policy model for a given task.

Figure 1:
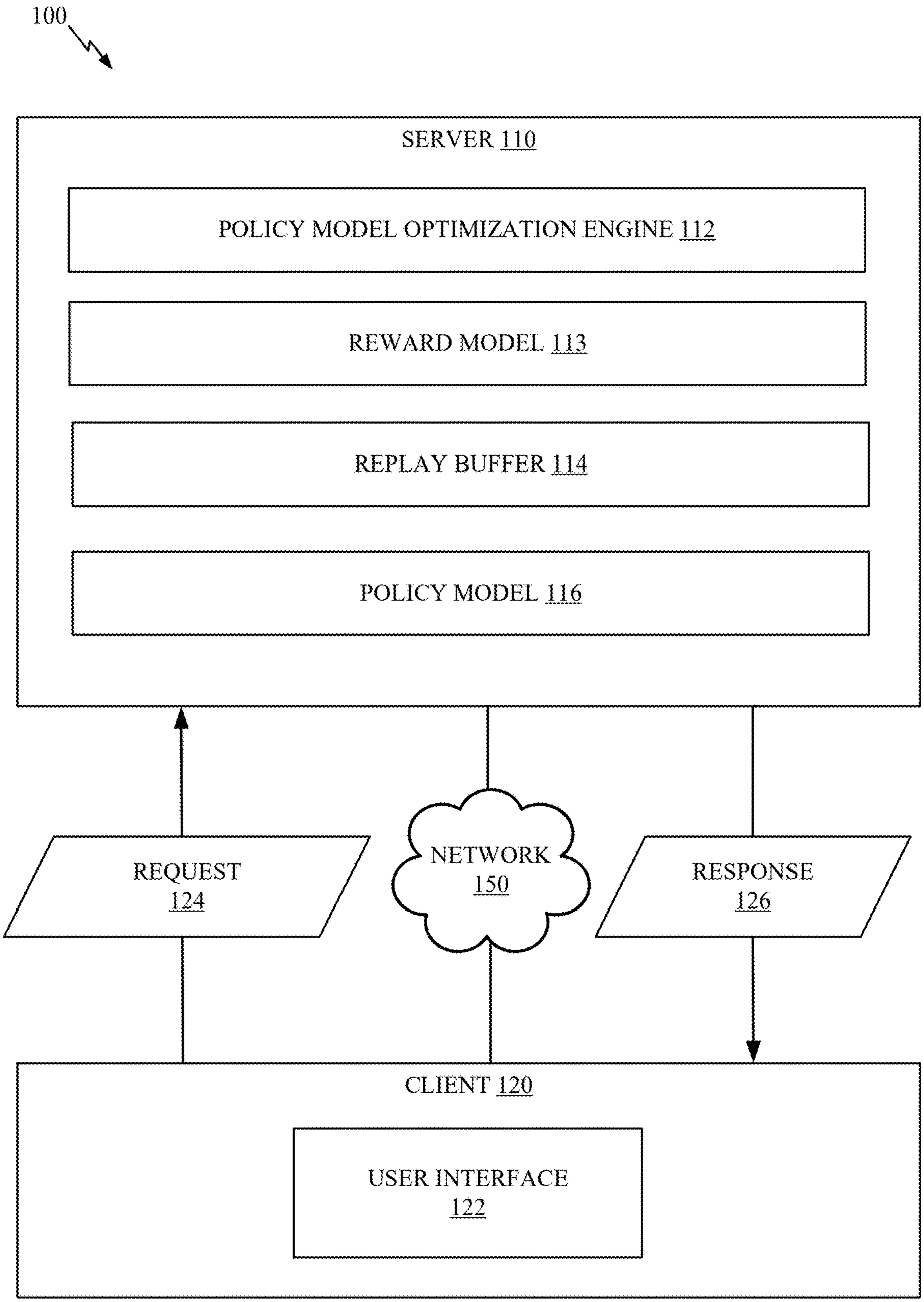
FIG. 1 is a block diagram of a computing environment related to optimizing a policy model in a reinforcement learning framework.

Example Computing Components Related to Optimizing a Policy Model in a Reinforcement Learning Framework FIG. 1 shows a system 100 for optimizing a policy model in a reinforcement learning framework. The system 100 comprises a server 110, which includes a policy model optimization engine 112, a reward model 113, a replay buffer 114, and a policy model 116. The server 110 is configured to process requests and responses in conjunction with a client 120.

The server 110 may function as an application server within the system 100, utilizing the policy model 116 to process incoming requests and generate corresponding responses, such as in connection with use of a software application. The server 110 is configured to handle requests from client devices, such as client 120, which may be connected to server 110 via a network 150 (e.g., which may represent any connection over which data may be transmitted, such as the Internet). Upon receiving a request 124 from the client 120, the server 110 employs the policy model 116 to generate an output completion, such as a natural language response or other type of response, based on the request. This output completion may be used to provide a response 126 back to the client 120 (e.g., which may be the output completion itself or a response derived from the output completion).

The server 110 is further equipped to perform optimization of the policy model 116 through a multi-phase process. The policy model optimization engine 112 within the server 110 is responsible for optimizing the policy model 116. It utilizes the replay buffer 114 to store and manage data, enabling efficient reuse of samples during the optimization process. The replay buffer 114 stores tuples comprising, for example, input queries, output completions, scalar reward values, and log probabilities, facilitating multiple optimization steps from the same data. For instance, during a generation phase, policy model optimization engine 112 may sample input queries from a task distribution (e.g., input queries received from clients, such as via request 124, and/or other stored and/or generated input queries) and, for each such input query, generate multiple output completions using policy model 116. The task distribution may refer to the distribution of tasks for which policy model 116 may be used to generate responses. Policy model optimization engine 112 may determine rewards for the output completions using techniques described herein (e.g., using reward model 113), and may store the output completions and the rewards in association with the corresponding input query in replay buffer 114.

The replay buffer 144 is a data structure used to store and manage data (e.g., generated in connection with the training of a policy model in a reinforcement learning framework). It is designed to facilitate the reuse of previously generated data across multiple steps (e.g., multiple optimization steps), thereby enhancing training efficiency and reducing computational costs. The replay buffer 114 may store data in the form of tuples or other forms. By maintaining a diverse set of samples, the replay buffer allows for the sampling of overlapping data across different optimization phases, enabling the system to leverage historical data for more effective policy model updates. This mechanism addresses the issue of sample waste by minimizing the need for fresh inferences at each optimization step, contributing to a more efficient and scalable training process.

Reward model 113 may, for example, comprise a machine learning model or other mathematical or rules-based model configured to output rewards for output completions. In the context of a GRPO framework, a reward model functions as a critical component for evaluating the quality of output completions generated by a policy model. The reward model is designed to assign scalar reward values to each output completion based on its performance relative to a predefined set of criteria or objectives. These criteria may include factors such as relevance, accuracy, coherence, or any other metric deemed pertinent to the task at hand. The rewards model 113 may be implemented using various types of machine learning models, each offering distinct capabilities for evaluating output completions. These models may include, but are not limited neural networks, transformer models, support vector machines, decision trees, ensemble models, Bayesian networks, reinforcement learning models, regression models, and/or the like. Each of these models can be trained (e.g., through a supervised learning process) using historical data to accurately assign reward values to output completions, thereby facilitating the optimization of the policy model within the reinforcement learning framework.

The reward model 113 may operate by receiving an output completion as input and processing it through a series of evaluations to determine its alignment with the desired outcomes. This evaluation process may involve comparing the output completion against a reference dataset, applying heuristic rules, or utilizing a machine learning model trained to predict reward values based on historical data. The resulting scalar reward value reflects the degree to which the output completion meets the specified criteria, providing a quantitative measure of its quality.

Policy model optimization engine 112 may also store additional information in replay buffer 114, such as log probabilities and, in some embodiments, computed advantages. In the GRPO framework, the rewards are used to compute advantages for each output completion within a group. These advantages are determined by comparing the scalar reward values of the output completions, allowing the system to identify which completions perform better relative to others in the same group. The computed advantages are then utilized to guide the optimization of the policy model, enabling it to learn from past performance and improve its ability to generate high-quality output completions in future iterations. In some embodiments the advantages are computed during the generation phase and stored in replay buffer 114, while in other embodiments the advantages are not stored in replay buffer 114 and are instead computed based on data sampled from replay buffer 114 during the model optimization phase.

During the optimization phase, policy model optimization engine 112 may sample a group of stored tuples from the replay buffer 114 and compute advantages for each output completion relative to other output completions in the group using techniques described herein (or the advantages may have already been computed during the generation phase and stored in replay buffer 114). This process may involve utilizing normalized reward differences to determine the relative advantages of the output completions, which are then used to modify the parameters of the policy model 116. For example, modifying the parameters of the policy model 116 may be based on evaluating an objective function based on the determined advantages of the output completions and iteratively modifying one or more parameters of policy model 116 through a supervised learning process. The server 110, through its policy model optimization engine 112, facilitates the iterative improvement of the policy model 116, thereby enhancing the model's performance in generating accurate and contextually relevant responses to client requests.

Policy model 116 may, for example, be a machine learning model configured to receive input queries and to generate outputs in response. For example, policy model 116 may be a neural network, a transformer model, a language processing machine learning model such as an LLM, a tree-based model such as a gradient boosted tree or random forest model, a regression model, a support vector machine, a Bayesian belief network, a diffusion model, a convolutional neural network (CNN), a recurrent neural network (RNN), a generative adversarial network (GAN), a deep belief network (DBN), a Boltzmann machine, a Markov decision process (MDP), a reinforcement learning model, and/or the like. In other embodiments, policy model 116 may be a rules-based model that is configured to evaluate inputs to determine outputs according to rules and/or logic.

Policy model 116 may, for example, have been trained in advance and/or on an ongoing basis through supervised learning techniques. Supervised learning generally involves utilizing a labeled dataset, where each input data point is paired with a corresponding target output. During the training process in supervised learning, the model processes the input data and generates predictions, which are then compared to the actual target outputs using an objective function. The objective function quantifies the difference between the predicted outputs and the true outputs, providing a measure of the model's performance (e.g., in terms of loss). The model's parameters are iteratively adjusted to minimize this loss, typically through optimization algorithms such as gradient descent, gradient ascent, and/or the like. By continuously updating the model's parameters based on the computed gradients of the objective function, the model learns to map inputs to outputs more accurately. This iterative process continues until the model achieves a satisfactory level of accuracy on the training data, at which point it is considered trained and can be evaluated on unseen data to assess its generalization capabilities. In the present case, improved GRPO techniques described herein may be used to train policy model 116.

Server 110 may operate as a central component within the system 100, enabling efficient processing of requests and generation of responses, while simultaneously optimizing the policy model 116 to improve its capabilities over time. The server's ability to leverage the replay buffer 114 for data reuse across multiple optimization steps contributes to the overall efficiency and scalability of the system, particularly in the context of large-scale language model fine-tuning. It is noted that in alternative embodiments, optimization of policy model 116 and use of policy model 116 to handle requests from clients may be performed on separate computing devices.

The client 120 includes a user interface 122, which facilitates interaction with the system 100. For example, a user may provide an input query via a user interface 122, such as requesting information, content, assistance, and/or the like. The client 120 sends a request 124 (e.g., including an input query received via user interface 122) to the server 110 via a network 150. The network 150 enables communication between the client 120 and the server 110, allowing the server 110 to process the request 124 and generate a response 126 (e.g., using policy model 116), which is then transmitted back to the client 120. In some aspects, response 126 may be displayed via user interface 122, such as providing the user with the requested information, content, assistance, and/or the like. In other aspects, request 124 and response 126 may not directly relate to input from a user, and may relate to automated processes performed by software components.

GRPO Techniques

Figure 2:
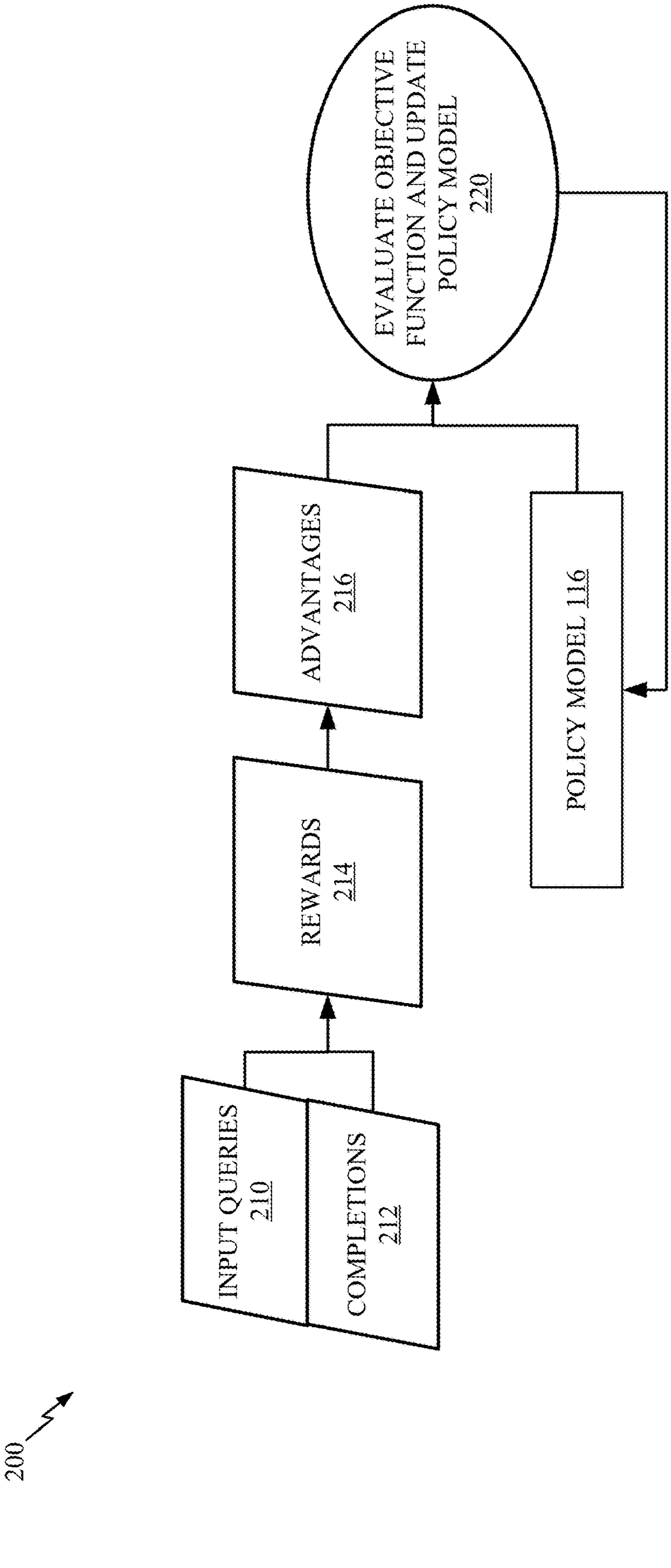
FIG. 2 is an illustration of grouped relative policy optimization.

FIG. 2 is an illustration 200 of a technique for optimizing a policy model within a reinforcement learning framework according to GRPO techniques. Illustration 200 includes policy model 116 of FIG. 1.

The process depicted in illustration 200 begins with input queries 210, which are derived from a task distribution. For example, the task distribution may refer to a range of possible tasks that can be accomplished using policy model 116 of FIG. 1, and input queries 210 may be samples from a set of stored input queries, such as including input queries previously provided by one or more users, input queries generated by one or more experts or developers, input queries automatically generated (e.g., using a language processing machine learning model such as an LLM), and/or the like. These input queries 210 are used to generate completions 212, which represent a plurality of output completions for each input query. For example, policy model 116 may be used to generate completions 212 based on input queries 210 (e.g., by providing input queries 210 as inputs to policy model 116 and receiving completions 212 as outputs from policy model 116 in response to input queries 210). In some aspects, multiple completions 212 are generated for each individual input query 210.

The completions 212 are evaluated, such as using reward model 113 of FIG. 1, to assign scalar reward values, which are represented as rewards 214. These rewards 214 are then utilized to compute advantages 216 for each output completion. The advantages 216 are calculated based on the scalar reward values and are used to determine the relative performance of each output completion within a group.

The computation of advantages in the GRPO framework is a critical component for optimizing policy models, particularly in the context of reinforcement learning. The advantage computation process involves determining the relative performance of each output completion within a group, based on the scalar reward values assigned to those completions.

The computed advantage reflects the relative performance of an output completion compared to the average performance of the group (e.g., based on scalar rewards). A positive advantage indicates that the output completion performed better than the average, while a negative advantage suggests it performed worse.

These computed advantages are then utilized to guide the optimization of the policy model 116. The policy model parameters are adjusted based on the advantages, such as through a gradient ascent step based on evaluation of an objective function, to enhance the model's ability to generate high-quality output completions in future iterations. This process allows the policy model to learn from past performance and improve its decision-making capabilities over time.

The evaluation of the objective function and the subsequent update of the policy model are performed at the evaluate objective function and update policy model step 220. For example, step 220 may receive the advantages 216 and the policy model 116 and may facilitate the modification of the policy model parameters to produce an optimized version of the policy model 116. The updated policy model 116 may then be fed back into the system to continue the optimization process and/or for use in generating new responses to requests from clients.

For example, for each query (e.g., representative of an input query 210) in a set of queries Q (e.g., representative of all of input queries 210), the system samples a group of outputs (e.g., representing a subset of completions 220) from the old policy (e.g., the version of policy model 116, prior to optimization) and then optimizes the policy model (e.g., representing a candidate optimized version of policy model 116) by maximizing an objective function (e.g., at step 220). In an example, the objective function is represented as:

$$\mathcal{J}_{GRPO}(\theta) = \mathbb{E}\left[q \sim P(Q), \{o_i\}_{i=1}^{G} \sim \pi_{old}(\cdot \mid q)\right]$$

$$\left[\frac{1}{G}\sum_{i=1}^{G}\left(\min\left(\frac{\pi_\theta(o_i \mid q)}{\pi_{old}(o_i \mid q)}A_i, \text{clip}\left(\frac{\pi_\theta(o_i \mid q)}{\pi_{old}(o_i \mid q)}, 1-\varepsilon, 1+\varepsilon\right)A_i\right) - \beta\mathcal{D}_{KL}(\pi_\theta \,\|\, \pi_{ref})\right)\right]$$

$$\mathcal{D}_{KL}(\pi_\theta \,\|\, \pi_{ref}) = \frac{\pi_{ref}(o_i \mid q)}{\pi_\theta(o_i \mid q)} - \log\frac{\pi_{ref}(o_i \mid q)}{\pi_\theta(o_i \mid q)} - 1$$

In the above equation, $J_{GRPO}(\theta)$ represents the objective function, E is the expected value (e.g., a statistical measure that represents the average outcome of a random variable, weighted by the probabilities of each possible outcome), $\varepsilon$ and $\beta$ are hyper-parameters, and $A_i$ is the advantage, computed using a group of rewards corresponding to the outputs within each group:

$$A_i = \frac{r_i - \text{mean}(\{r_1, r_2, \ldots, r_G\})}{std(\{r_1, r_2, \ldots, r_G\})}$$

The function P(Q) may be used to evaluate the relative performance of different output completions within the group, contributing to the computation of advantages for optimizing the policy model. The variable G in the above equation may represent the number of output completions generated for each input query during the generation phase. Furthermore, in the above equation $D_{KL}(\pi_\theta \| \pi_{ref})$ represents a KL regularization term for computing the KL divergence between the current policy $\pi_\theta$ and a reference policy $\pi_{ref}$. Furthermore, min represents a minimum function that returns the minimum of a set of value, clip represents a clip function used to limit the values of a variable to being within a specified range, log may represent a log probability, mean represents a mean function, and std represents a standard deviation function.

Figure 3:
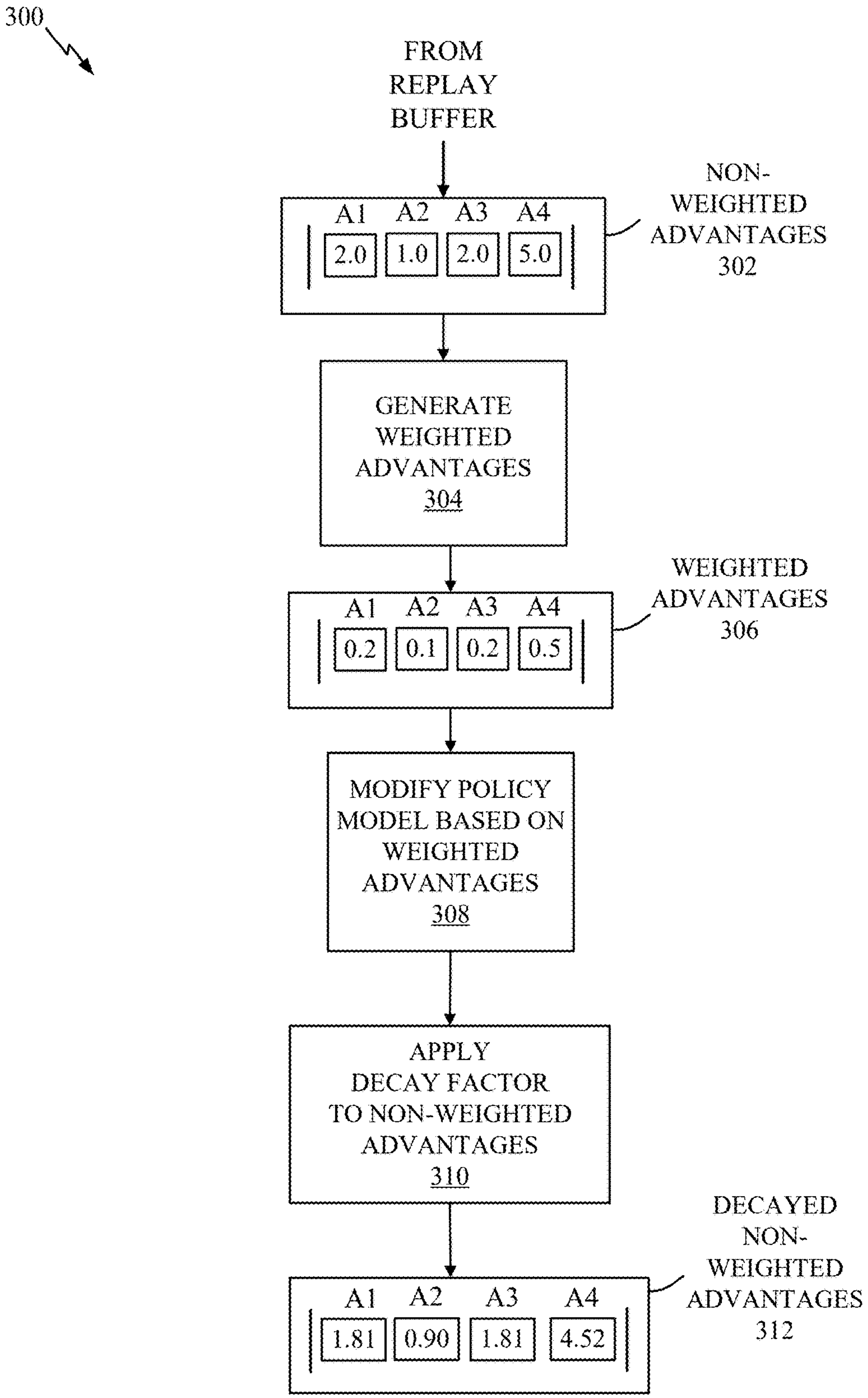
FIG. 3 is an illustration of a process for computing weighted advantages for a group of output completions stored in a replay buffer.

Example Process for Optimizing a Policy Model a Reinforcement Learning Framework Using Weighted Advantages for Output Completions FIG. 3 depicts an example process 300 for weighting advantages computed for a group of output completions generated in response to an input query and stored in a replay buffer according to some embodiments of the present disclosure.

As shown, non-weighted advantages 302 may be computed for the output completions. For example, the group of output completions may include four different output completions and the non-weighted advantages 302 may include respective advantages (e.g., A1, A2, A3, A4) calculated for each respective output completion in the group of output completions. Furthermore, the absolute of each respective non-weighted advantage of the non-weighted advantages 302 may be taken so that the non-weighted advantages 302 are all positive advantages (that is, greater than 0).

At 304, the process 300 may include generating weighted advantages 306 based on the non-weighted advantages 302. For instance, generating the weighted advantages 306 may include obtaining an absolute value of each of the non-weighted advantages 302. Generating the weighted advantages 306 may further include computing a sum of the absolute values of the non-weighted advantages 302 and computing the weighted advantages 306 based on the sum of the absolute values of the non-weighted advantages 302. For instance in some embodiments, computing the weighted advantages 306 based on the sum of the absolute values of the non-weighted advantages 302 may include dividing the absolute value of each of the non-weighted advantages 302 by the sum of the absolute values of the non-weighted advantages 302 to obtain each of the weighted advantages 306.

At 308, the process 300 may include applying GRPO-style updates to the policy model using the weighted advantages 306. For instance, applying the GRPO-style updates may include modifying, based on the weighted advantages 306, one or more parameters of the policy model over multiple iterations based on output completions that the policy model generates for the given input query during a training phase. In some embodiments, the iterations may be predefined (e.g., 2 iterations).

At 310, the process 300 may include applying a decay factor to the weighted advantages 306 after applying the GRPO-style updates to the policy model at 308. For instance, in some embodiments, each respective non-weighted advantage included in the non-weighted advantages 302 may be multiplied by a constant value (e.g., decay value) to generate decayed non-weighted advantages 312. In this manner, by reducing the non-weighted advantages 302 each time the policy model generates new output completions for the input query during the training phase, the non-weighted advantages 302 for the prior output completions may become less and less relevant to training the policy model as the policy model generates new output completions.

Figure 4:
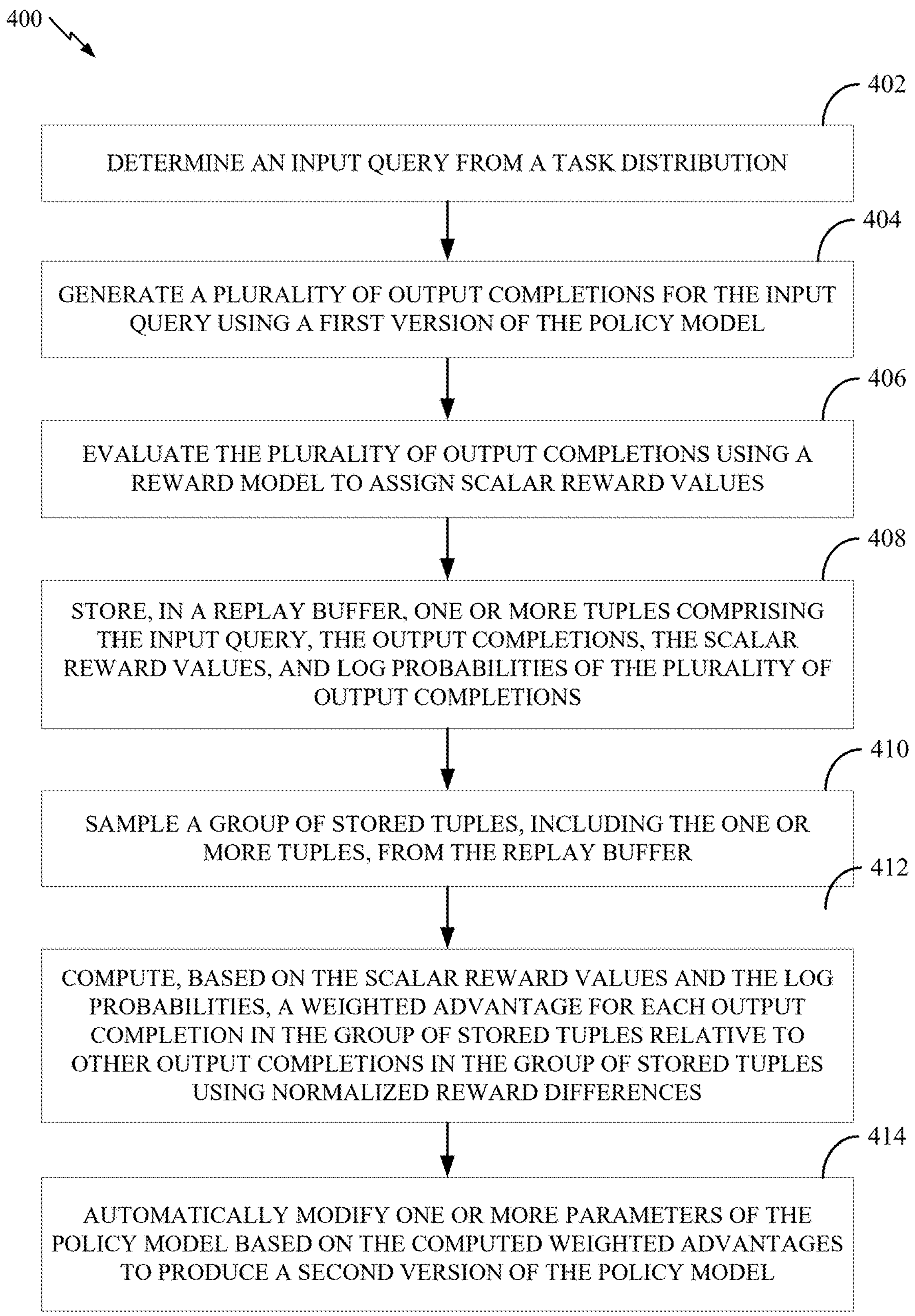
FIG. 4 depicts example operations related to optimizing a policy model in a reinforcement learning framework.

Example Operations for Optimizing a Policy Model in a Reinforcement Learning Framework FIG. 4 depicts example operations 400 related to optimizing a policy model in a reinforcement learning framework. For example, operations 400 may be performed by one or more components described above with respect to FIG. 1, such as policy model optimization engine 112 of FIG. 1, by one or more components of system 500B of FIG. 5B described below, and/or one or more other components.

Operations 400 begin at step 402, where an input query is determined from a task distribution. This step may involve selecting a query that will be used to generate outputs in subsequent steps.

At step 404, a plurality of output completions for the input query is generated using a first version of the policy model. This involves the policy model producing multiple possible completions or responses to the input query, which will be evaluated in the next step.

Step 406 involves evaluating the plurality of output completions using a reward model to assign scalar reward values. Each output completion is assessed by the reward model based on certain criteria, and a numerical reward value is assigned to quantify its effectiveness or quality.

In step 408, the process stores, in a replay buffer, one or more tuples comprising the input query, the output completions, the scalar reward values, and log probabilities of the plurality of output completions. This storage allows for the reuse of data in future optimization steps, enhancing efficiency.

Step 410 involves sampling a group of stored tuples, including the one or more tuples, from the replay buffer. This step selects specific data from the buffer to be used in the computation of advantages in the next step. Sampling strategies may vary, and may involve overlapping samples across multiple optimization phases. In some aspects, a sampling strategy may be based on the corresponding weighted advantages. For example, in some cases, tuples with relatively high weighted advantages may be favored for sampling over tuples with relatively lower weighted advantages. In some aspects, such as when selecting "negative" training examples, one or more tuples with relatively lower weighted advantages may be favored for sampling over one or more tuples with relatively higher weighted advantages.

At step 412, the method computes, based on the scalar reward values and the log probabilities, a weighted advantage for each output completion in the group of stored tuples relative to other output completions in the group using normalized reward differences. This computation helps in determining which outputs are more favorable compared to others. The weighted advantage computation may be performed during the generation phase (and the advantages may be stored in the replay buffer) or may be performed at the optimization phase based on data sampled from the replay buffer.

Finally, step 414 involves automatically modifying one or more parameters of the policy model based on the computed weighted advantages to produce a second version of the policy model. This step may involve updating the policy model to improve its performance based on the insights gained from the computed advantages.

Example Computing Systems

Figure 5A:
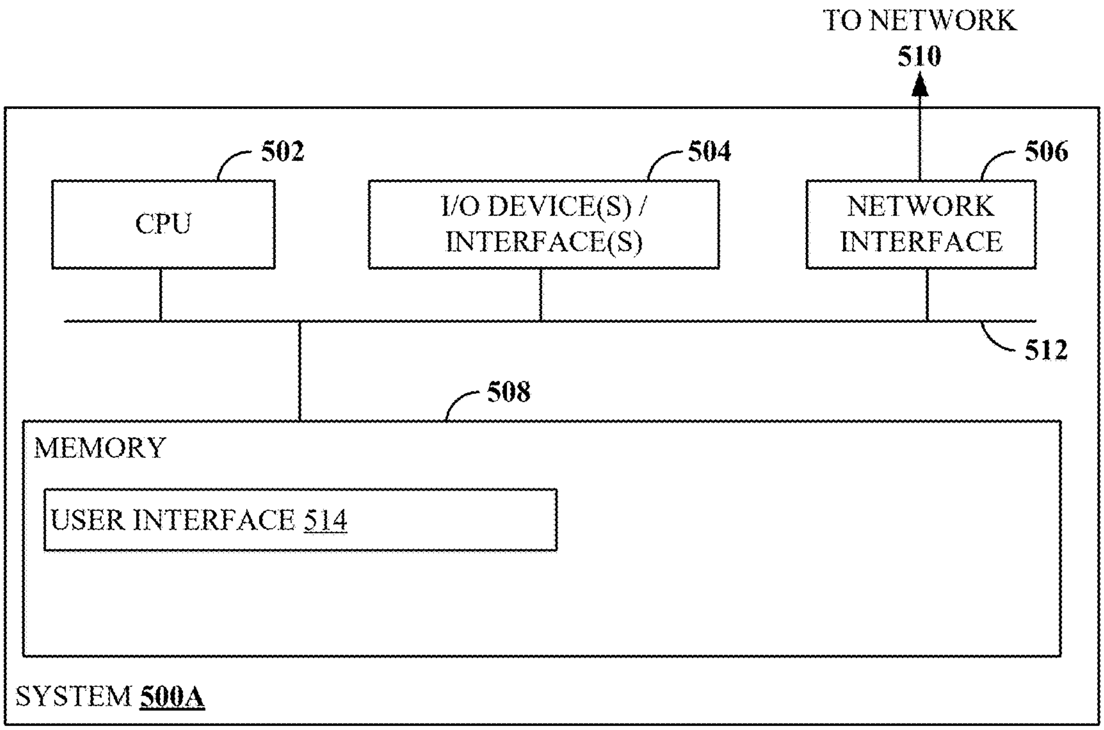
FIG. 5A is a block diagram of a computing system related to optimizing a policy model in a reinforcement learning framework.

FIG. 5A illustrates an example system 500A with which embodiments of the present disclosure may be implemented. For example, system 500A may be configured to perform one or more of operations 400 of FIG. 4. In one example system 500A corresponds to server 110 of FIG. 1.

System 500A includes a central processing unit (CPU) 502, one or more I/O device interfaces 504 that may allow for the connection of various I/O devices 504 (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes a user interface 514, which may be representative of user interface 122 of FIG. 1. For example, a user may interact with user interface 514 to request content or information, review and/or provide feedback with respect to automatically generated content or information, and/or the like. Feedback received from the user with respect to content or information generated using a policy model optimized using techniques described herein may be used as training data to re-train the policy model (e.g., in a subsequent optimization phase).

Figure 5B:
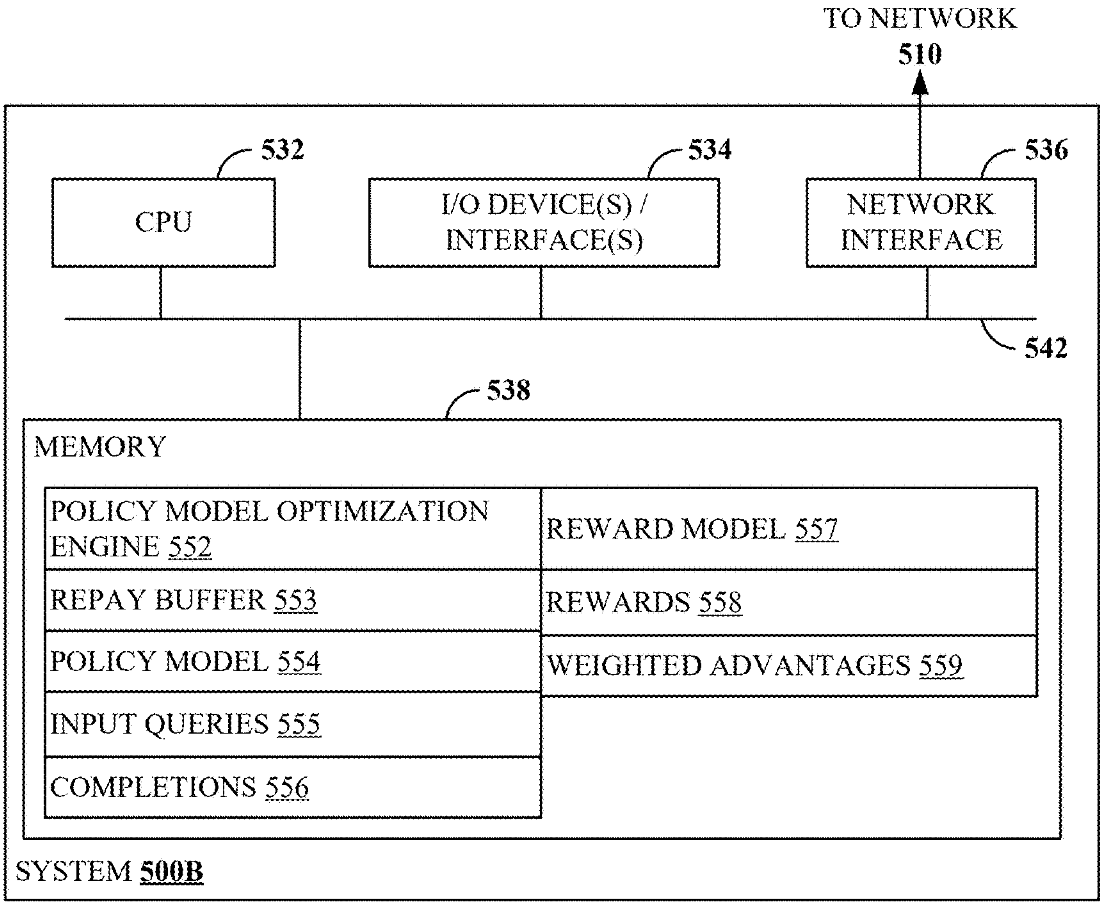
FIG. 5B is a block diagram of a computing system related to optimizing a policy model in a reinforcement learning framework.

FIG. 5B illustrates another example system 500B with which embodiments of the present disclosure may be implemented. For example, system 500B may correspond to client 120 of FIG. 1, and may be configured to perform one or more of operations 400 of FIG. 4.

System 500B includes a CPU 532, one or more I/O device interfaces 534 that may allow for the connection of various I/O devices 534 (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes policy model optimization engine 552, replay buffer 553, policy model 554, and reward model 557, which may be representative of policy model optimization engine 112, replay buffer 114, policy model 116, and reward model 113 of FIG. 1. Memory 538 further includes input queries 555 and completions 556, which may include input queries 210 and completions 212 of FIG. 2. Memory 538 further includes rewards 558 and weighted advantages 559, which may include weighted advantages 306 of FIG. 3. It is noted that systems 500A and 500B are included as examples, and certain functionality described with respect to systems 500A and/or 500B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for optimizing a policy model in a reinforcement learning framework, comprising:

generating a plurality of output completions for an input query using a first version of the policy model;

evaluating the plurality of output completions using a reward model to assign scalar reward values;

storing, in a replay buffer, one or more tuples comprising the input query, the output completions, the scalar reward values, and log probabilities of the plurality of output completions;

sampling a group of stored tuples, including the one or more tuples, from the replay buffer;

computing, based on the scalar reward values and the log probabilities, a weighted advantage for each output completion in the group of stored tuples relative to other output completions in the group of stored tuples using a normalized reward difference, wherein computing the weighted advantages for each output completion in the group comprises:

computing a non-weighted advantage for each output completion in the group using the normalized reward difference;

obtaining an absolute value of each of the non-weighted advantages;

computing a sum of the absolute values of the non-weighted advantages; and computing the weighted advantages based on the sum of the absolute values of the non-weighted advantages; and automatically modifying one or more parameters of the policy model, based on the weighted advantages to produce a second version of the policy model, wherein the automatically modifying comprises:

evaluating an objective function based on the weighted advantages; and performing, based on the evaluating, a gradient ascent step to modify the one or more parameters of the policy model to produce the second version of the policy model.

2. The method of claim 1, wherein computing the weighted advantages based on the sum of the absolute values of the non-weighted advantages comprises:

dividing the absolute value of each of the non-weighted advantages by the sum of the absolute values of the non-weighted advantages to obtain each of the weighted advantages.

3. The method of claim 1, further comprising:

after the automatically modifying of the one or more parameters of the policy model, reducing a numerical value of each of the non-weighted advantages.

4. The method of claim 3, wherein reducing the numerical value of each of the non-weighted advantages comprises:

multiplying the numerical value of each of the weighted advantages by a constant value.

5. The method of claim 1, wherein the policy model comprises a machine learning model, and wherein the automatically modifying of the one or more parameters of the policy model is part of a supervised learning process for training the policy model.

6. The method of claim 5, wherein the machine learning model is a language processing machine learning model, and wherein the plurality of output completions comprises a plurality of natural language responses generated by the language processing machine learning model based on the input query.

7. The method of claim 1, wherein the log probabilities are output by the first version of the policy model in connection with the generating of the plurality of output completions.

8. A system for optimizing a policy model in a reinforcement learning framework, comprising:

one or more processors;

a memory storing instructions that, when executed by the one or more processors, cause the system to:

generate a plurality of output completions for an input query using a first version of the policy model;

evaluate the plurality of output completions using a reward model to assign scalar reward values;

store, in a replay buffer, one or more tuples comprising the input query, the output completions, the scalar reward values, and log probabilities of the plurality of output completions;

sample a group of stored tuples, including the one or more tuples, from the replay buffer;

compute, based on the scalar reward values and the log probabilities, a weighted advantage for each output completion in the group of stored tuples relative to other output completions in the group of stored tuples using a normalized reward difference, wherein to compute the weighted advantage for each output completion in the group the instructions cause the system:

compute a non-weighted advantage for each output completion in the group using the normalized reward difference;

obtain an absolute value of each of the non-weighted advantages;

compute a sum of the absolute values of the non-weighted advantages; and compute the weighted advantages based on the sum of the absolute values of the non-weighted advantages; and automatically modify one or more parameters of the policy model, based on the weighted advantages to produce a second version of the policy model, wherein to automatically modify the one or more parameters of the policy model, the one or more processors are configured to:

evaluate an objective function based on the weighted advantages; and perform, based on evaluating the objective function, a gradient ascent step to modify the one or more parameters of the policy model to produce the second version of the policy model.

9. The system of claim 8, wherein to compute the weighted advantages based on the sum of the absolute values of the non-weighted advantages, the instructions cause the system to:

divide the absolute value of each of the non-weighted advantages by the sum of the absolute values of the non-weighted advantages to obtain each of the weighted advantages.

10. The system of claim 8, wherein the instructions, when executed by the one or more processors, further cause the system to:

after the automatically modifying of the one or more parameters of the policy model, reducing a numerical value of each of the non-weighted advantages.

11. The system of claim 10, wherein to reduce the numerical value of each of the non-weighted advantages, the instructions, when executed by the one or more processors, cause the system to:

multiply the numerical value of each of the non-weighted advantages by a constant value.

12. The system of claim 8, wherein the policy model comprises a machine learning model, and wherein the automatically modifying of the one or more parameters of the policy model is part of a supervised learning process for training the policy model.

13. The system of claim 12, wherein the machine learning model is a language processing machine learning model, and wherein the plurality of output completions comprises a plurality of natural language responses generated by the language processing machine learning model based on the input query.

14. The system of claim 8, wherein the log probabilities are output by the first version of the policy model in connection with generating the plurality of output completions.

15. A non-transitory computer-readable medium storing instructions that, when executed by one or more processors of a computing system, cause the computing system to:

generate a plurality of output completions for an input query using a first version of a policy model;

evaluate the plurality of output completions using a reward model to assign scalar reward values;

store, in a replay buffer, one or more tuples comprising the input query, the output completions, the scalar reward values, and log probabilities of the plurality of output completions;

sample a group of stored tuples, including the one or more tuples, from the replay buffer;

compute, based on the scalar reward values and the log probabilities, a weighted advantage for each output completion in the group of stored tuples relative to other output completions in the group of stored tuples using a normalized reward difference, wherein to compute the weighted advantage for each output completion in the group the instructions cause the system:

compute a non-weighted advantage for each output completion in the group using the normalized reward difference;

obtain an absolute value of each of the non-weighted advantages;

compute a sum of the absolute values of the non-weighted advantages; and compute the weighted advantages based on the sum of the absolute values of the non-weighted advantages; and automatically modify one or more parameters of the policy model, based on the weighted advantages to produce a second version of the policy model, wherein to automatically modify the one or more parameters of the policy model, the one or more processors are configured to:

evaluate an objective function based on the weighted advantages; and perform, based on evaluating the objective function, a gradient ascent step to modify the one or more parameters of the policy model to produce the second version of the policy model.

16. The non-transitory computer-readable medium of claim 15, wherein to compute the weighted advantages based on the sum of the absolute values of the non-weighted advantages, the instructions cause the system to:

divide the absolute value of each of the non-weighted advantages by the sum of the absolute values of the non-weighted advantages to obtain each of the weighted advantages.

17. The non-transitory computer-readable medium of claim 15, wherein the instructions, when executed by the one or more processors, further cause the system to:

after the automatically modifying of the one or more parameters of the policy model, reducing a numerical value of each of the weighted advantages.

* * * * *